US006943702B2

(12) United States Patent
Kato

(10) Patent No.: US 6,943,702 B2
(45) Date of Patent: Sep. 13, 2005

(54) BROADCASTING SYSTEM AND ITS BROADCASTING TRANSMISSION APPARATUS AND RECEPTION TERMINAL APPARATUS

(75) Inventor: Akira Kato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 10/390,781

(22) Filed: Mar. 19, 2003

(65) Prior Publication Data

US 2003/0179110 A1 Sep. 25, 2003

(30) Foreign Application Priority Data

Mar. 22, 2002 (JP) ....................................... 2002-081993

(51) Int. Cl.[7] ............................ H04Q 7/00; G08B 1/08; G08G 1/123; G01C 21/00

(52) U.S. Cl. .................. 340/988; 340/539.13; 340/905; 340/995.1; 340/995.24; 340/996; 455/456.1; 455/456.3; 455/457; 455/566; 701/208; 701/213

(58) Field of Search .............................. 340/539.1, 905, 340/988, 539.13, 995.1–995.24; 701/117–119, 208, 213; 455/456.1, 456.3, 557, 566

(56) References Cited

U.S. PATENT DOCUMENTS 5,636,245 A * 6/1997 Ernst et al. ................. 375/259
6,522,250 B1 * 2/2003 Ernst et al. .............. 340/539.1
6,535,164 B2 * 3/2003 Imazeki et al. ........ 342/357.17
6,657,558 B2 * 12/2003 Horita et al. .......... 340/995.13
6,759,970 B1 * 7/2004 Horita et al. ............... 340/905
6,785,551 B1 * 8/2004 Richard .................... 455/456.1

FOREIGN PATENT DOCUMENTS

CN 1267834 9/2000
EP 1022704 A1 * 7/2000 ............ G08G/1/09
JP 2001-53699 2/2001
KR 2001-0005202 1/2001
KR 2001-0021264 3/2001

* cited by examiner

*Primary Examiner*—Jeffery Hofsass
*Assistant Examiner*—Lam Pham
(74) *Attorney, Agent, or Firm*—Oblon, Spivak, McClelland, Maier & Neusadt, P.C.

(57) ABSTRACT

A broadcasting center multiplexes contents obtained by adding information indicative of presentation conditions including a "location", a "moving direction", and the "period of validity of data" to stream data. A broadcasting wave dispatching apparatus transmits the contents to the entire information provided area through a broadcasting wave. A reception terminal apparatus mounted in a vehicle receives the broadcasting wave distributed by the broadcasting station while the vehicle is passing through the information provided area. The reception terminal apparatus then separates the multiplexed contents from the received signal for storage. It also obtains status information including the location of the vehicle, the current time, and the moving direction of the vehicle, from information provided by a vehicle location measuring apparatus. The reception terminal apparatus then sequentially compares the status information with the presentation condition information, added to the stored contents. It then decodes and reproduces matching contents.

25 Claims, 5 Drawing Sheets

BROADCASTING SYSTEM AND ITS BROADCASTING TRANSMISSION APPARATUS AND RECEPTION TERMINAL APPARATUS

CROSS-REFERENCE TO RELATED APPLICATIONS

This application is based upon and claims the benefit of priority from the prior Japanese Patent Application No. 2002-081993, filed Mar. 22, 2002, the entire contents of which are incorporated herein by reference.

BACKGROUND OF THE INVENTION

1. Field of the Invention

The present invention relates to a broadcasting system that provides local information to, for example, vehicles traveling on a toll road or a superhighway using sounds, video streams, or the like, the local information having different contents for respective points or areas.

2. Description of the Related Art

On the present toll roads and superhighways, service is provided which communicates traffic information through audio broadcasting. Such conventional traffic information broadcasting service uses a single broadcasting wave to provide traffic information having different contents for respective points, e.g. respective interchanges. Thus, broadcasting wave transmitting apparatuses are installed at the respective points to which traffic information must be transmitted. Further, each broadcasting wave transmitting apparatus transmits a broadcasting wave to a limited area so as to avoid interference. In this case, information with the same contents is transmitted to vehicles in which a broadcasting wave reception apparatus is mounted, regardless of the direction in which the vehicle is traveling. Consequently, all vehicles in the same area are forced to receive the same information whether they are traveling on an "inbound lane" or an "outbound lane".

In other words, a conventional broadcasting system of traffic information is configured to a plurality of broadcasting wave transmitting apparatus which is installed in the spot where a broadcast is necessary and each of the apparatus transmits broadcasting wave to only limited area. Because of this, in order to cover the whole area of lot of highway each, enormous numerical apparatuses become necessary. A vast cost depends on a construction and maintenance and management of such an infrastructure.

As described above, for a conventional broadcasting system represented by the traffic information broadcasting service to distribute different pieces of local information to the respective areas, broadcasting wave transmitting apparatuses must be installed away from one another so as to avoid interference among the information provided areas. Further, since the same local information is transmitted to listeners regardless of the directions in which they are moving, the listeners are inconveniently forced to listen to information irrelevant to their destinations.

BRIEF SUMMARY OF THE INVENTION

It is an object of the present invention to provide a broadcasting system that eliminates the need to consider the mutual interference of broadcasting waves in each area even if different pieces of information are provided to the respective areas and that enables a reception terminal to selectively present information on the destination of the vehicle depending on a direction in which the vehicle is moving.

A broadcasting system according to the present invention comprises:

- a broadcasting transmission apparatus which generates a plurality of broadcasting signal of local information added presentation condition information to information, multiplexes and modulates the broadcasting signal, and transmits the modulated signal using a broadcasting wave; and
- a reception terminal apparatus which receives the broadcasting wave and demodulates the broadcasting signal, separates the local information from the broadcasting signal, stores the local information, recognizes the presentation condition information added to the local information, obtains status information for each of the conditions, and sequentially compares the status information with the presentation condition information to read and reproduce local information that meets the conditions.

That is, with the broadcasting system configured as described above, presentation condition information representative of "presentation location information" in order to specify a presentation range or "presentation local code e.g. Prefecture code and road code, a "moving direction", and a "period of validity" is added to local information comprising stream data such as sounds or videos or stored file data such as characters or sound read-aloud codes. These stored data are distributed to all service areas using a carousel transmission method. For example, a reception terminal apparatus mounted in a vehicle stores received local information and compares the "current location" and "moving direction" obtained by a vehicle location measuring apparatus separately mounted in the vehicle, with the "presentation location information or presentation location code" and "moving direction" in the presentation condition information, while checking the "period of validity". The reception terminal apparatus then automatically selects and presents only data meeting all conditions. Accordingly, broadcasting is realized which is equivalent to stream information service that uses a single broadcasting wave to deliver different information to the respective points.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present invention will be described below in detail with reference to the drawings.

Figure 1:
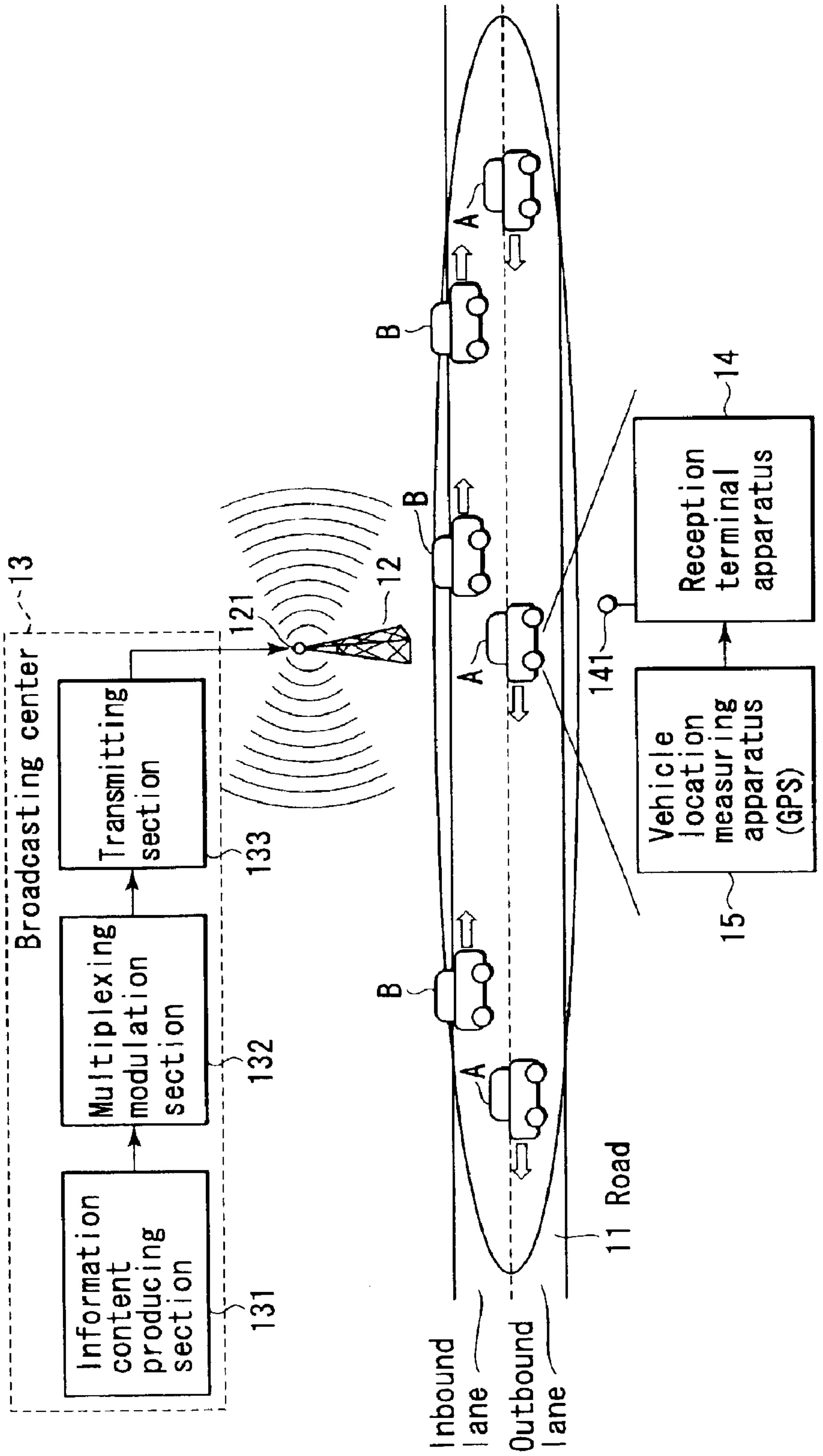
FIG. 1 is a conceptual drawing schematically showing an embodiment of a broadcasting system according to the present invention.

FIG. 1 is a conceptual drawing schematically showing a broadcasting system according to the present invention which provides service information that includes local information such as road (superhighway, toll road, and main highway) traffic information, the congestion status of a service area, and a bargain of special products.

In FIG. 1, reference numeral denotes a road having inbound and outbound lanes. One or more broadcasting wave transmitting apparatuses 12 are arranged at predetermined locations along the road 11. The transmitting apparatus 12 is connected to a broadcasting center 13 through a communication line such as an optical fiber laid in a roadside zone. A broadcasting signal transmitted by the broadcasting center 13 is converted into a broadcasting wave of a predetermined frequency band. The broadcasting wave is then transmitted from a transmission antenna 121 with no distinction in both directions of the inbound and outbound lanes.

A vehicle A traveling on the outbound lane of the road 11 and a vehicle B traveling on the inbound lane are each provided with a reception terminal apparatus 14 that receives and reproduces a broadcasting wave and a vehicle location measuring apparatus 15 comprising a GPS (Global Positioning System) navigation apparatus, according to the present system. The vehicle location measuring apparatus 15 can obtain the current location information and the current time of day information by, for example, analyzing GPS satellite signals and then provide these pieces of information as required.

Description will be given below of a configuration of transmission facilities in the broadcasting center 13, shown in FIG 1. In FIG 1, an information content producing section 131 produces contents which includes local information to be provided. The information content producing section 131 produces contents by adding presentation condition information composed of a "presentation location information or presentation location code", "moving direction", and a "period of validity of data" to stream data such as sounds or videos to be provided. In the "presentation location information or presentation location code" information, points for which local information is provided are represented by latitude, longitude and radius value for deciding presentation area of a circle, or area code such as prefectural code, road code, or the like; these points include, for example, the locations of accidents and of shops for special products. The "moving direction" information is represented by an identifier indicating information related to a vehicle traveling in the inbound or outbound lane of the road. The "period of validity of data" information is represented by a time stamp indicating date, hour and minute so as to, for example, allow the data to be discarded according to an information update period.

A multiplexing modulation section 132 multiplexes the contents produced by the information content producing section 131, and then modulates them using a predetermined modulation method. A transmitting section 133 then transmits the modulated contents to the broadcasting wave transmitting apparatus 12. The broadcasting wave transmitting apparatus 12 then transmits them as a broadcasting wave.

Figure 2:
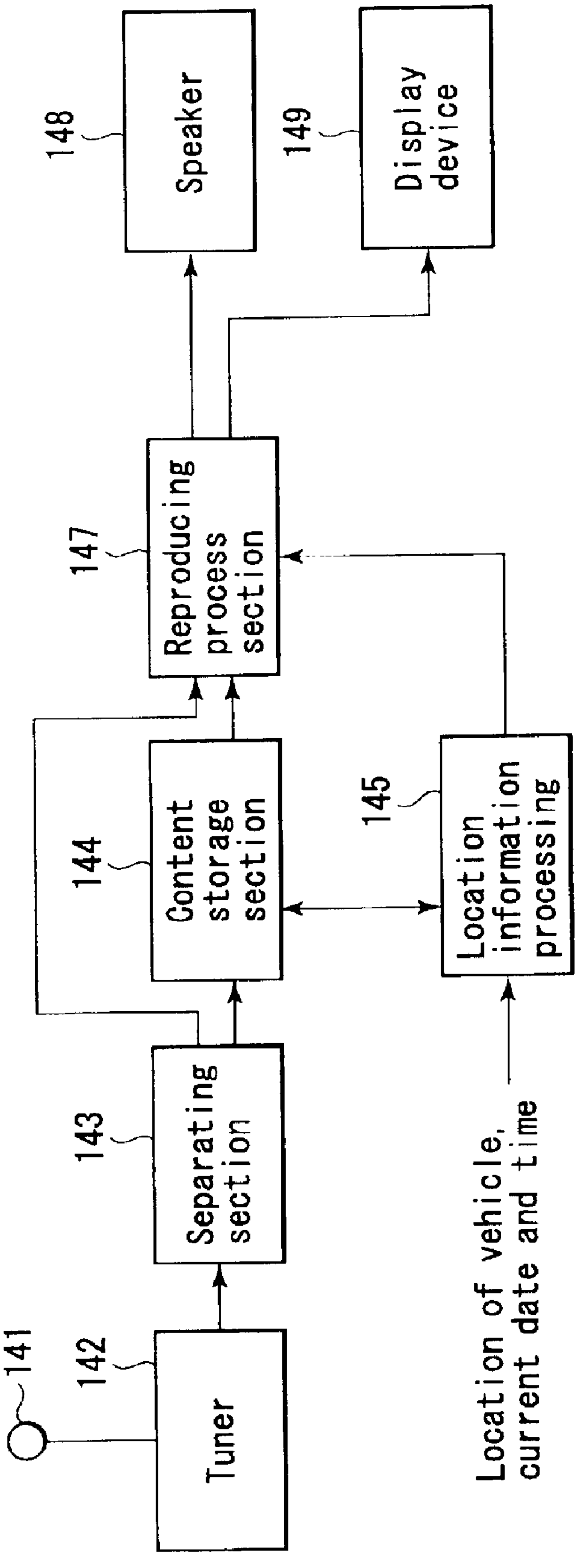
FIG. 2 is a block diagram showing a configuration of a reception terminal apparatus used in the system in FIG. 1.

FIG. 2 is a block diagram showing for-instance of a configuration of the reception terminal apparatus 14, mounted in a vehicle. In FIG. 2, when the apparatus-mounted vehicle passes through an area, an antenna 141 caught a broadcasting wave from the broadcasting wave transmitting apparatus 12. A tuner 142 then receives and detects a content multiplexed signal. A separating section 143 separates the signal into contents and stores these contents in a content storage section 144.

On the other hand, the reception terminal apparatus 14 comprises a location information processing section 145. The location information processing section 145 obtains, from the vehicle location measuring apparatus 15, a status information, i.e. the current time of day and location, a identification code on the road along which the vehicle is traveling. The location information processing section 145 then determines, from this information, the direction in which the apparatus-mounted vehicle is traveling on the road. The status information obtained by the location information processing section 145 is supplied a reproducing process section 147. The reproducing process section 147 sequentially compares the condition information, i.e. the "presentation location information or presentation location code", "moving direction", and "period of validity of data" in the contents stored in the content storage section 144, with the status information, i.e. the current time of day and location and the moving direction. Then, the reproducing process section 147 compares contents meeting all conditions, and then reads the corresponding contents from the content storage section 144.

If the inputted contents are sound stream data, the reproducing process section 147 decodes sound signals and outputs the decoded signals to a speaker 148. If the inputted contents are video stream data, the reproducing process section 147 decodes video signals and outputs the decoded signals to a display device 149.

Figure 3:
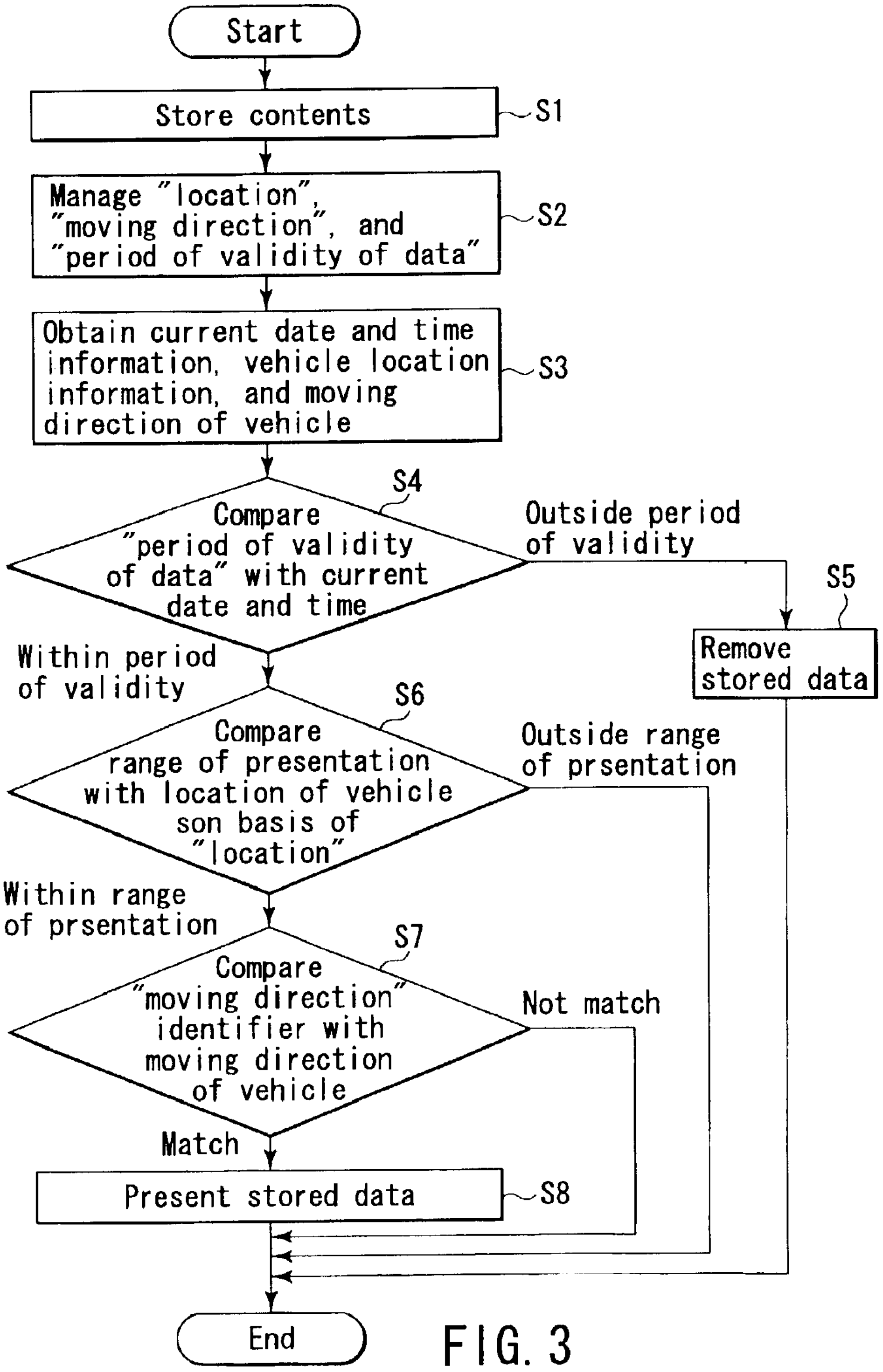
FIG. 3 is flow chart showing the flow of a specific process executed by the reception terminal apparatus in FIG. 2.

With reference to FIG. 3, description will be given of the flow of a specific process executed by the reception terminal apparatus 14.

When reception of a broadcasting wave is started, contents obtaining from the received signal are stored in the content storage section 144 (step S1). At this time, the presentation condition information such as the "presentation location information or presentation location code", "moving direction (identifier)", and "period of validity of data" added to the stream data in the contents is managed (step S2). On the other hand, information including the current location or current location code of the vehicle and the current time of day is obtained from the vehicle location measuring apparatus 15, and the moving direction of the vehicle is calculated (step S3).

Once all information has been connected by the above process, the "period of validity of data" condition is first compared with the current time (step S4). If the current time of day falls outside the period of validity, the corresponding contents are removed from the storage section 144 (step S5). If the current time of day falls within the period of validity, then the "presentation location information or presentation location code" condition is compared with the current location or current location code of the vehicle to determine whether or not the current location or current location code of the vehicle falls within a presentation range(step S6). If the current location or current location code falls outside the range, the series of operations are ended. If the current location or current location code falls within the range, then the "moving direction (identifier)" condition is compared with the moving direction of the vehicle to determine whether or not the former matches the latter (step S7). If the "moving direction (identifier)" condition does not match the moving direction of the vehicle, the series of operations are ended (step S7). If they match each other, the corresponding stored contents are read and this stream data is decoded and reproduced (step S8). The series of operations are ended.

As described above, in the system of the present embodiment, the broadcasting center 13 multiplexes contents obtained by adding information indicative of the presentation conditions including the "presentation location or presentation location code", "moving direction", and "period of validity of data" to stream data. Then, the one or more broadcasting wave transmitting apparatuses 12 transmit the contents to the entire information provided area using a broadcasting wave. On the other hand, the reception terminal apparatus 14, mounted in the vehicle, receives the broadcasting wave transmitted by the broadcasting wave transmitting apparatuses 12 while the vehicle is passing through the information provided area. The reception terminal apparatus 14 then separates the multiplexed contents from the received signal for storage. It also obtains status information including the current location or current location code of the vehicle, the current time of day, and the moving direction of the vehicle, from information provided by the vehicle location measuring apparatus 15. The reception terminal apparatus 14 then sequentially compares the status information with the presentation condition information, added to the stored contents. It then decodes and reproduces matching contents.

Accordingly, with the above system, the broadcaster adds the presentation conditions to stream data and provides the resulting information using a carousel method. Upon receiving a broadcasting wave, the receiver stores all information and presents only information meeting the broadcasting presentation conditions, according to the presentation conditions. It is thus possible to provide only required information to the user at the required location and at the required point of time. This eliminates the cumbersome need to listen to unwanted information.

For example, it is assumed that the occurrence of an accident at a certain point in the inbound direction is broadcast as local information. Assume that the occurrence of an accident at a local information. If the "presentation location information or presentation location code" falls within the inside of a circle whose radius is r and whose center is at x and y coordinates of the point of the accident, the "moving direction" is the inbound direction, and the "period of validity of data" is 2 hours (or the time of day), the local information can be provided only to the vehicles which travel in the inbound direction and reach the point of the accident within 2 hours from the designated time. The local information is not presented to the other vehicles, for example, the vehicles traveling in the outbound direction.

In the above case, the broadcaster designates the presentation range. However, the reception terminal apparatus can set a presentation range with the "presentation location information or presentation location code" at the center. The presentation range need not be fixed and, if the user can freely set the range, it is useful to the user.

Further, the "presentation location information or presentation location code" falls within the inside of a circle whose radius us r and whose center is at x and y coordinates. However, the presentation range can be formed as a rectangular area defined by x1, y1, x2 and y2 coordinates.

Alternatively, a function may be provided to clear the sorting process based on the collation of the conditions so that the user can listen to all information.

Furthermore, in the above embodiment, the broadcasting wave dispatching apparatus installed on the road or near it transmits a broadcasting wave. However, other broadcasting forms are possible. For example, broadcasting service which includes the local broadcasting service may be incorporated into satellite digital broadcasting or ground digital broadcasting. By way of example, description will be given of an embodiment in which the above local broadcasting service is incorporated into a satellite broadcasting system for mobile objects, which has recently been developed enthusiastically.

Figure 4:
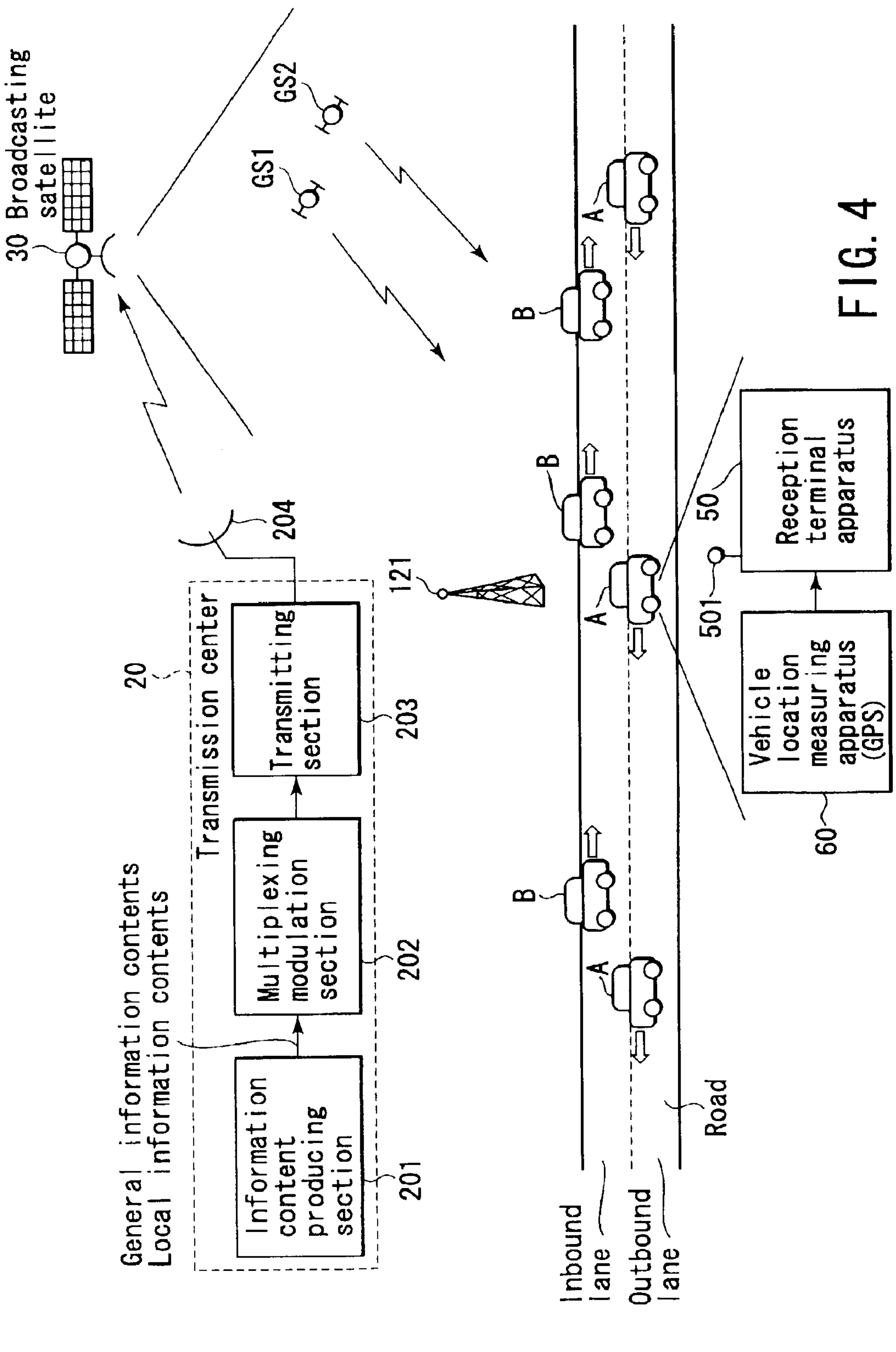
FIG. 4 is a conceptual drawing schematically showing an embodiment of a satellite broadcasting system according to the present invention.

FIG. 4 schematically shows a configuration of the above satellite digital broadcasting system. The satellite digital broadcasting system comprises a broadcasting station 20 and a broadcasting satellite 30 arranged on a stationary orbit to relay a broadcasting wave from the ground.

In the broadcasting station 20, an information content producing section 201 converts program information contents produced and edited by a program provided, into a predetermined broadcasting format. In the present embodiment, the program information contents include program information contents for general listeners (hereinafter referred to as "general-listener information contents") and local information contents to which presentation condition information composed of the "presentation location information or presentation location code", "moving direction", and "period of validity of data" is added as in the previously described embodiment. The information contents of a plurality of programs produced are compressively encoded using, for example, MPEG4.

The information content producing section 201 produces a plurality of information contents, e.g. video data which is encoded by MPEG-4 Visual method, audio data which is encoded by MPEG-2 AAC method. A multiplexing modulation section 202 properly assigns the information contents produced by the information content producing section 201 to a predetermined channel (the multiplexing modulation section 202 uses, for example, 30 channels in total, and has a transmission capacity of 256 Kbps per channel). The information contents are multiplexed using, for example, MPEG-2 Systems method and then modulated using a CDM (Code Division Multiplex) method. A transmission section 203 converts the modulated contents into a radio frequency band, e.g. a Ku band (12.5 to 18 GHz), and then transmits them from a transmission antenna 204 to the broadcasting satellite 30 via a transmission path.

The broadcasting satellite 30 comprises a Ku band antenna and an S band (for example, 2.6 GHz) antenna. Then, a broadcasting wave transmitted by the broadcasting station 20 is received by the Ku band antenna and converted into an S band. The S band is transmitted from the S band antenna to a ground service area.

In the service area, not only a broadcasting reception apparatus (not shown) fixedly installed in, for example, an office or a home but also a reception terminal apparatus 50 mounted in a vehicle or which is portable and mobile can receive a broadcasting wave transmitted on the S band by the broadcasting satellite 30. An automobile in which the reception terminal apparatus 50 is mounted with a vehicle location measuring apparatus 60 that receives GPS signals from GPS satellites (GS1, GS2) to obtain information on the current time of day and the current location.

Figure 5:
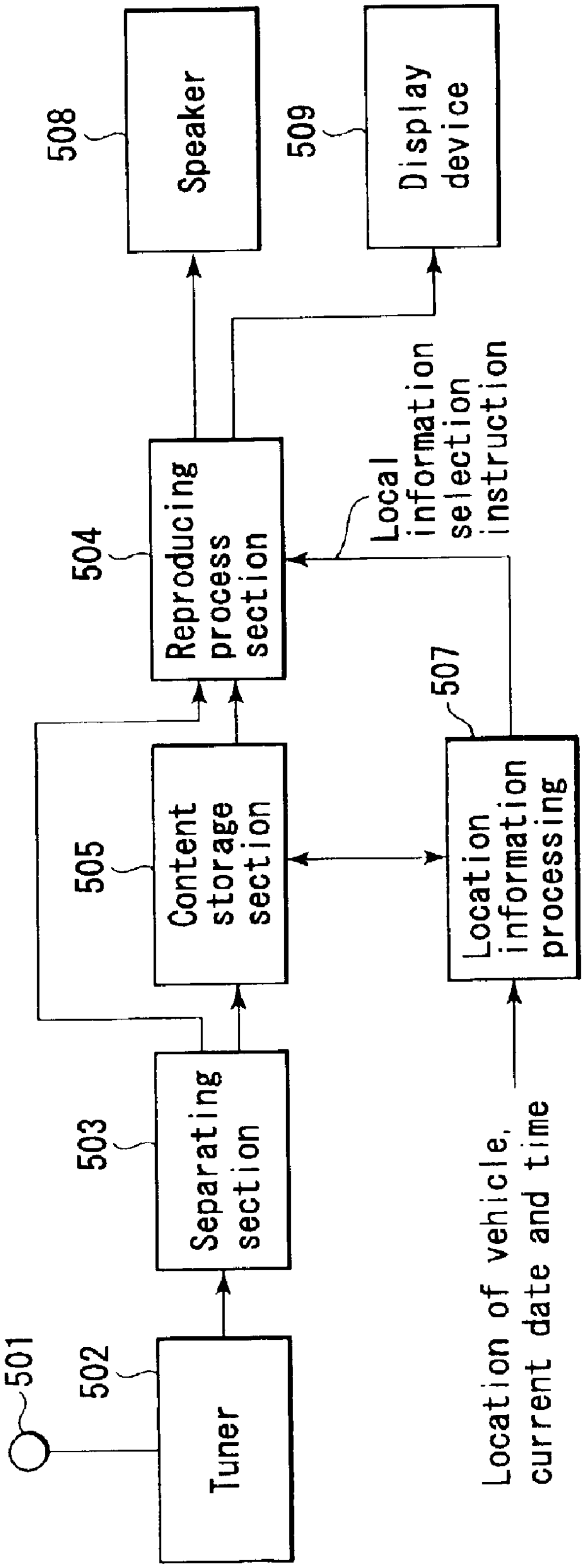
FIG. 5 is a block diagram showing a configuration of a reception terminal apparatus used in the system in FIG. 4.

FIG. 5 is a block diagram showing a specific configuration example of the reception terminal apparatus 50.

In FIG. 5, a broadcasting wave from the broadcasting satellite 30 is caught by the S band antenna 501. A tuner 502 receives and detects a content multiplexed signal. Then, a separating section 503 separates the signal into general information contents and local information contents according to an identifier. The general information contents are transmitted directly to a reproducing process section 504. The local information contents are stored in a content storage section 505. Once the local information contents are stored in the content storage section 505. A reproducing process section 504 reads presentation condition information added to the contents.

On the other hand, a location information processing section 507 obtains the current time of day and location from the vehicle location measuring apparatus 60 to determine a moving direction from these pieces of information. The status information obtained by the location information processing section 507 is supplied to a reproducing process section 504. The reproducing process section 504 sequentially compares the condition information that was acquired previously with the status information, i.e. the current time of day and location and the moving direction. Then, the information sorting section 506 sorts contents meeting all conditions. It then notifies the content storage section 505 of the sorted information and outputs an input switching instruction to the reproducing process section 504. Upon receiving this notification, the content storage section 505 reads the corresponding contents and then transmits them to the reproducing process section 504.

The reproducing process section 504 receives the general information contents normally transmitted directly by the separating section 503. It then decodes and reproduces sound or video stream data, and then outputs the reproduced data. When accumulated local information is shown, the reproducing process section 504 compares the presentation condition information of accumulated local information with the current time of day and location and the moving direction, and reads local contents information in line with a condition from the content storage section 505. If the reproduced output is a sound signal, it is outputted to a speaker 508. If it is a video signal, it is outputted to a display device 509.

That is, the reception terminal apparatus configured as described above normally receives and reproduces general information contents. When there was a request to show contents of local information from a user, it automatically compares condition information added to the stored contents with status information on the vehicle. If the result of this determination indicates that the conditions are met, the reception terminal apparatus reads the corresponding local information contents. The reception terminal apparatus then switches a reproducing process from the general information contents to the local information contents to present local information on a destination and the like.

Accordingly, a satellite broadcasting system according to the above embodiment enables realization of not only general broadcasting service but also the previously described local broadcasting service. This serves to provide excellent serves as mobile broadcasting. In this case, it is unnecessary to provide exclusive transmission station facilities that must be installed along the road according to the conventional system. This serves to reduce costs required to construct the entire system. The above satellite broadcasting for moving objects involves the presence of areas in which electric waves from the satellites cannot be caught (for example, the inside of tunnels). Relayed retransmission is carried out for these areas using a gap filler apparatus. The gap filler apparatus retransmits a broadcasting wave from the satellites using the same frequency. Thus, the reception terminal apparatus can receive the broadcasting wave retransmitted by the gap filler apparatus even in an area in which electric waves from the satellites cannot be caught. This prevents degradation of service quality such as a failure to obtain required information associated with the incapability of reception.

Further, in the description of the above embodiment, vehicles are taken by way of example. However, the utilization of the above satellite digital broadcasting enables the present invention to be applied to airplanes, ships, trains, and the like. The present invention can also be applied to local information broadcasting service such as provision of information on ships to a cellular phone terminal in a department store or an underground shopping mall.

Moreover, in the description of the above embodiment, the system is constructed using stream data. However, a similar system can be constructed using file data of multimedia type to be stored such as characters or graphics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcasting system comprising:

a broadcasting transmission apparatus which generates a plurality of broadcasting signals of local information by adding presentation condition information to information, multiplexes and modulates the broadcasting signals, and transmits the modulated signals using a broadcasting wave; and a reception terminal apparatus which receives the broadcasting wave and demodulates the broadcasting signals, separates the local information from the broadcasting signals, stores the local information, recognizes the presentation condition information added to the local information, obtains status information for each of the conditions, and sequentially compares the status information with the presentation condition information to read and reproduce local information that meets the conditions; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

2. The system according to claim 1, wherein the presentation condition information further includes presentation location information or presentation location code, and a period of validity, and the reception terminal apparatus further obtains status information on the current location information or current location code of a vehicle, the current time of day, and sequentially compares the status information with the presentation condition information to sort, read, and output local information which is included in the stored information and which meets the conditions.

3. A broadcasting system comprising:

a broadcasting transmission apparatus which generates a plurality of broadcasting signals of local information by adding presentation condition information to information, multiplexes and modulates the broadcasting signals, and transmits the modulated signals using a broadcasting wave; and a reception terminal apparatus which receives the broadcasting wave and demodulates the broadcasting signals, separates the local information from the broadcasting signals, stores the local information, recognizes the presentation condition information added to the local information, obtains status information for each of the conditions, and sequentially compares the status information with the presentation condition information to read and reproduce local information that meets the conditions; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information;

signal generating means for adding presentation condition information to local information to generate a broadcasting signal; and transmission means for multiplexing and modulating the broadcasting signal generated by the signal generating means and transmitting the modulated signal using a broadcasting wave; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

4. The apparatus according to claim 3, wherein the presentation condition information further includes presentation location information or presentation location code, and a period of validity.

5. A broadcasting system comprising:

a broadcasting transmission apparatus which generates a plurality of broadcasting signals of local information by adding presentation condition information to information, multiplexes and modulates the broadcasting signal, and transmits the modulated signals using a broadcasting wave; and a reception terminal apparatus which receives the broadcasting wave and demodulates the broadcasting signals, separates the local information from the broadcasting signals, stores the local information, recognizes the presentation condition information added to the local information, obtains status information for each of the conditions, and sequentially compares the status information with the presentation condition information to read and reproduce local information that meets the conditions; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information;

receiving and demodulating means for receiving the broadcasting wave, separating and demodulating the broadcasting signal;

separating means for separating the local information from the output signal from the receiving and demodulating means;

storage means for storing each piece of the local information separated by the separating means;

status information obtaining means for obtaining status information corresponding to presentation condition information added to each piece of the local information stored in the storage means; and information sorting means for sequentially comparing and collating the status information obtained by the status information obtaining means with the presentation condition information to sort matching local information from the information stored in the storage means; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

6. The apparatus according to claim 5, wherein when the presentation condition information further includes presentation location information or presentation location code, and a period of validity, the status information obtaining means further obtains status information on the current location information or current location code, and the current time.

7. The apparatus according to claim 5, wherein when the presentation condition information includes location information, the information sorting means identifies the range of presentation on the basis of a location specified by the location information to detect that the current location of the vehicle falls within this particular range to determine that one of the conditions is met or the presentation location code is met the current location code.

8. The apparatus according to claim 5, wherein when the presentation condition information includes the range of presentation or the presentation location code is met the current location code, the information sorting means detects that the current location of the vehicle falls within the range of presentation to determine that one of the conditions is met.

9. The apparatus according to claim 5, further comprising:

information sort clearing means for clearing information sorting based on the presentation condition information and reading and outputting all local information.

10. The apparatus according to claim 5, further comprising:

condition changing means for causing a receiver to change a select condition of the presentation condition information.

11. The system according to claim 1, wherein the broadcasting transmission apparatus multiplexes the broadcasting signal and a broadcasting signal for digital broadcasting and then modulates and transmits the multiplexed signal.

12. A local information providing method comprising:

generating a plurality of broadcasting signals of local information by adding presentation condition information to information and transmitting the broadcasting signals using a digital broadcasting wave; and receiving the broadcasting wave, storing the local information, recognizing the presentation condition information added to the local information, obtaining status information for each of the conditions, comparing the status information with the presentation condition information, reading and reproducing local information that meets the conditions; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

13. The method according to claim 12, wherein the presentation condition information further includes presentation location information or presentation location code, and a period of validity, and in receiving side, the obtaining status information on the current location information or current location code of a vehicle, the current time of day, and sequentially compares the status information with the presentation condition information to sort, read, and output local information which is included in the stored information and which meets the conditions.

14. A satellite broadcasting system comprising:

a broadcasting transmission apparatus arranged at a ground station to generate a plurality of broadcasting signals of local information by adding presentation condition information to information, multiplex the resultant information and general program information to generate a broadcasting signal, modulate the generated broadcasting signals, and transmit the modulated signal using a broadcasting wave; and a satellite relay apparatus mounted in a satellite to receive the broadcasting wave transmitted by the broadcasting transmission apparatus and transmit the received broadcasting wave to a ground service area; and a reception terminal apparatus which receives, in the service area, the broadcasting wave transmitted by the satellite relay apparatus and demodulates the broadcasting signal, separates the broadcasting signal into general program information and local information, stores the local information, recognizes the presentation condition information added to the local information, obtains status information for each of the conditions, sequentially compares the status information with the presentation condition information, and reads local information that meets the conditions; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

15. The system according to claim 14, further comprising:

a gap filler apparatus which receives, in the service area, a broadcasting wave retransmitted by the satellite relay apparatus and retransmits the broadcasting wave to an arbitrary area.

16. The system according to claim 14, wherein the presentation condition information further includes presentation location information or presentation location code, and a period of validity, and the reception terminal apparatus further obtains status information on the current location of a vehicle, the current time of day, and sequentially compares the status information with the presentation condition information to sort, read, and output local information which is included in the stored information and which meets the conditions.

17. A broadcasting transmission apparatus included in the system according to claim 14, which comprises:

signal generating means for generating a plurality of broadcasting signals of local information by adding presentation condition information to information, multiplexing the resultant information and general program information to generate a broadcasting signals; and transmission means for modulating the broadcasting signal generated by the signal generating means and transmitting the modulated signal using a broadcasting wave.

18. The apparatus according to claim 17, wherein the presentation condition information further includes presentation location information or presentation location code, and a period of validity.

19. A reception terminal apparatus included in the system according to claim 14, which comprises:

receiving and demodulating means for receiving the broadcasting wave and demodulating the broadcasting signals;

separating means for separating the output signal from the receiving and demodulating means into the general program information and local information;

storage means for storing the local information separated by the separating means;

status information obtaining means for obtaining status information corresponding to presentation condition information added to each piece of the local information stored in the storage means;

information sorting means for sequentially comparing and collating the status information obtained by the status information obtaining means with the presentation condition information to sort matching local information from the information stored in the storage means; and information reproducing means for selectively reproducing the general program information and the local information sorted by the information sorting means; wherein the presentation condition information includes moving direction information which is represented by indication information related to a vehicle traveling in an inbound or outbound lane of a road; and the reception terminal apparatus obtains status information on moving direction related to a vehicle traveling in an inbound or outbound lane of a road, and sequentially compares the moving direction of the status information with the moving direction of the presentation condition information.

20. The apparatus according to claim 19, wherein when the presentation condition information further includes presentation location information or presentation location code, and a period of validity, the status information obtaining means further obtains status information on the current location of a vehicle, and the current time of day.

21. The apparatus according to claim 19, wherein when the presentation condition information includes location information, the information sorting means identifies the range of presentation on the basis of a location specified by the location information to detect that the current location of the vehicle falls within this particular range to determine that one of the conditions is met or the presentation location code is met the current location code.

22. The apparatus according to claim 19, wherein when the presentation condition information includes the range of presentation or the presentation location code is met the current location code, the information sorting means detects that the current location of the vehicle falls within the range of presentation to determine that one of the conditions is met.

23. The apparatus according to claim 19, further comprising:

information sort clearing means for clearing information sorting based on the presentation condition information and reading and outputting all local information.

24. The apparatus according to claim 19, further comprising:

condition changing means for causing a receiver to change a select condition of the presentation condition information.

25. The apparatus according to claim 19, wherein in addition to the broadcasting wave transmitted by the satellite relay apparatus, the receiving and demodulating means receives and demodulates a broadcasting signal transmitted by a gap filler apparatus which receives and retransmits the broadcasting wave transmitted by the satellite relay apparatus.

* * * * *